United States Patent [19]

Lee et al.

[11] Patent Number: 5,241,815
[45] Date of Patent: Sep. 7, 1993

[54] HEAT-RECOVERING-THRUST-TURBINE HAVING ROTATIONAL FLOW PATH

[76] Inventors: Dae S. Lee, Rm A-106, Hanshin Apt., #258 NonHyun-Dong, Kangnam-Ku, Seoul, Rep. of Korea; Ho K. Shin, 40, Manri-Dong 2 ga,, Chung-Ku, Seoul, Rep. of Korea

[21] Appl. No.: 872,915

[22] Filed: Apr. 22, 1992

[51] Int. Cl.$^5$ .......................... F02C 3/045; F02C 7/10
[52] U.S. Cl. .................. 60/39.43; 60/39.511; 60/39.75; 415/79
[58] Field of Search ................. 60/39.35, 39.36, 39.43, 60/39.511, 39.75, 269; 415/74, 87

[56] References Cited

U.S. PATENT DOCUMENTS

| | | | |
|---|---|---|---|
| 2,589,239 | 3/1952 | Fallon | 60/39.75 |
| 2,611,241 | 9/1952 | Schultz | 60/39.43 |
| 3,269,120 | 8/1966 | Sabatiuk | 60/39.75 |
| 3,635,577 | 1/1972 | Dee | 415/79 |

Primary Examiner—Louis J. Casaregola
Attorney, Agent, or Firm—Vidas, Arrett & Steinkraus

[57] ABSTRACT

A heat-recovering-thrust-turbine including the rotational flow path has been invented in present work. This thrust turbine consists of a rotating disc having unique shape and functions of compressor and turbine together, a combustion chamber, manifolds for heat recovering and a divergent nozzle having the curved flow path in a different way of conventional gas turbine engines utilizing a straight discharging mechanism of the exhaust gases.

Thus, this invented thrust turbine is able to perform the combined function such as compression of air, cooling of the hot section, recovery of the wasted heats and generation of the thrust and the turbine power being used for the air compression, simultaneously.

6 Claims, 4 Drawing Sheets

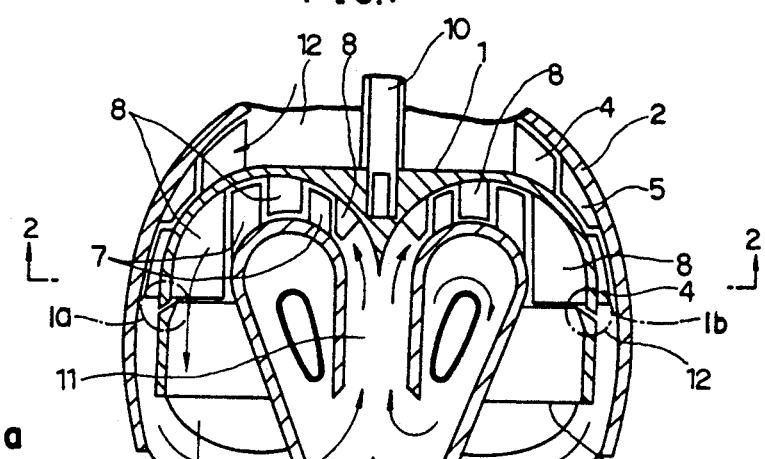
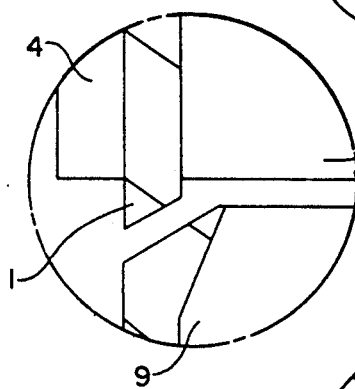
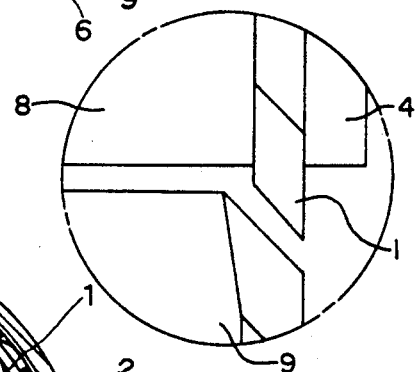
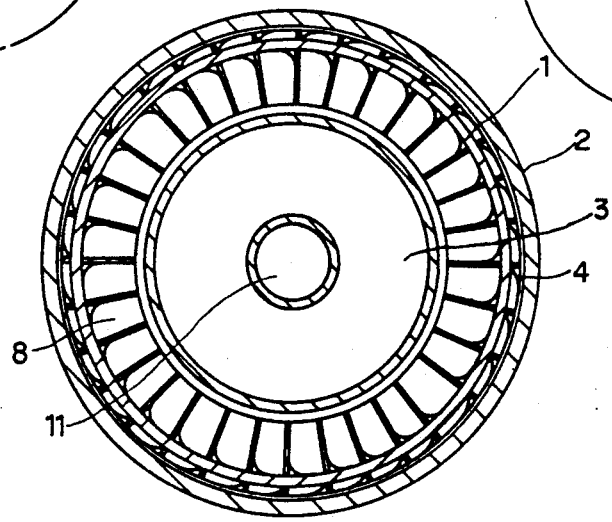

HEAT-RECOVERING-THRUST-TURBINE HAVING ROTATIONAL FLOW PATH

BACKGROUND OF THE INVENTION

1. Field of the Invention

This work is related to the development of a heat-recovering-thrust-turbine engine having a unique rotational flow path compared with the flow path of the conventional gas turbine engines.

The invented thrust turbine engine is lighter, simpler in its parts structure and smaller in size. However, it develops higher thrust due to the generation of gases having high pressure and velocity.

2. Description of the Prior Art

The conventional gas turbine engine generally consists of compressor(s), combustion chamber(s) and turbine(s). In this engine, huge quantities of air are compressed by a compressor. After this compressed air greatly heated and accelerated by burning with fuel, the air remaining after the burning process and the gases produced by combustion cause a turbine rotor, mounted on the same shaft as that of the compressor, to rotate.

On leaving a turbine section, the air and gases are expelled to the outside air through a divergent nozzle. As the gases flow into the divergent nozzle, the velocity of the gases progressively increases towards the nozzle exit. The reaction to this further increase in momentum is a pressure force acting on the inner wall of the nozzle. A component of this force acting parallel to the longitudinal axis of the nozzle produces the further increase in thrust.

In the divergent nozzle, pressure loss and energy loss occur for the reason that the area of the divergent nozzle is increased towards its exit.

If $\theta$, a, $V_0$, m are the diverging angle of the exhaust nozzle, and the acceleration, the initial velocity and mass of the exhaust gases, respectively, the momentum of the exhaust gases acting on the inner wall of the exhaust nozzle after t seconds, P, can be written in the form $$P = m(at - (V_0 + at) \tan \theta)$$

In the above equation, thrust of the conventional gas turbine engine can be derived as P sin $\theta$. Therefore, when the pressure or the velocity of the exhaust gases passing through the nozzle increases, the pressure loss and the energy loss of these gases could be increased.

In the conventional gas turbine engines, the exhaust gases flow straight forward to the nozzle exit without rotation. However, in the present invention, the heat-recovering-thrust-turbine engine with rotational flow path has a unique nozzle which has been designed to rotate the exhaust gases by an angle of 360 degrees and then, expell it outside air. Thus, the propulsive force or thrust of the thrust turbine is increased as the pressure and the velocity of the exhaust gases are increased.

The thrust turbine engine of the invention has several unique advantages; in the thrust turbine, the centrifugal force of the exhaust gases can be completely converted to its thrust. The air from the entrance of the thrust turbine engine is compressed in a compression section, and rushes into a combustion chamber through the manifolds connecting the combustion chamber to the exit of the compression section, being perpendicularly placed to the center line of the thrust turbine. Therefore, part of the heat content of the exhaust gases can be recovered by cold air passing through the manifolds having been devised in this work.

And also, the specific volume (the ratio of the engine volume to its thrust) and the specific weight (the ratio of the engine weight to its thrust) could be lowered more than that of the conventional gas turbine engines because the thrust turbine has equipped a simple and combined rotating disc to which rotor blades, for a compression and the generation of turbine power, are attached.

SUMMARY OF THE INVENTION

The configuration of the thrust turbine devised in this work is more unique and simpler than that of the conventional gas turbine engine.

The shape of a rotating disc is similar to the solid of revolution generated by rotating a plane of the semicircle of radius r, being laid on the positive or negative x-axis of the cartesian coordinates, through a complete revolution in space about a line on the y-axis of the cartesian coordinates.

A combustion chamber in the shape of the inner wall of the aforementioned rotating disc is located inside the disc, so that the curved flow path of exhaust gases are made between the inner wall of the rotating disc and the outer wall of the combustion chamber.

Rotor blades and stator blades of the turbine are attached at the inner wall of the rotating disc and the outer wall of the combustion chamber, respectively. Hot expanding gases being heated by combustion chamber rush into the curved flow path. In this curved flow path, the gases rotate from the exit of the combustion chamber by an angle of 180 degrees and cause the turbine rotors to rotate in order to generate power for driving the compressor blades.

Simultaneously, the pressure force and the centrifugal force induced by the expanding gases act on the inner wall of the rotating disc, so that the propulsive force of the thrust turbine is developed.

The compressor rotor blades on the outer wall of the rotating disc raise the pressure of the incoming air before passing it on to the combustion chamber.

Cold air passes through manifolds which have one end fitted to the exit of the compression section and their other end fitted to the entrance of the combustion chamber across the exhaust nozzle. When cold air passes through the manifolds the temperature of the compressed air rushing into the combustion chamber is increased due to heat exchange of gases exiting via the exhaust nozzle.

BRIEF DESCRIPTION OF THE DRAWINGS

FIG. 1 is a cross-sectional view of the heat-recovering-thrust-turbine according to the invention;

FIGS. 1a and 1b are enlarged views of the respectively designated portions a and b of FIG. 1;

FIG. 2 is a cross-sectional view taken along line 2—2 of the FIG. 1;

DETAILED DESCRIPTION OF THE PREFERRED EMBODIMENTS

As shown in FIG. 1, 2, 4, 5 and 6, the rotating disc (1) has a unique shape similar to the solid of revolution generated by rotating a plane of the semicircle of radius r, being lain on the positive or negative x-axis of the cartesian coordinates, through a complete revolution in space about a line on the y-axis of the cartesian coordinates. And this rotating disc (1) is mounted on a shaft (10).

Figure 3:
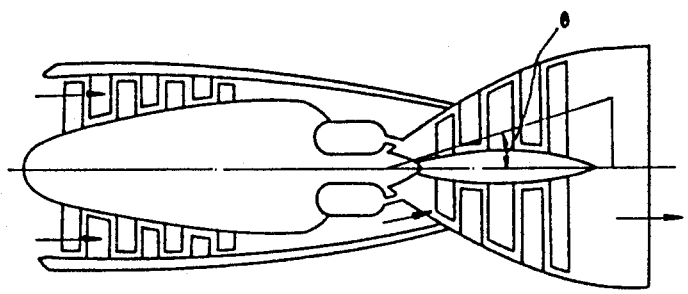
FIG. 3 is a cross-sectional plan view of the jet engine of the prior art.
Figure 4:
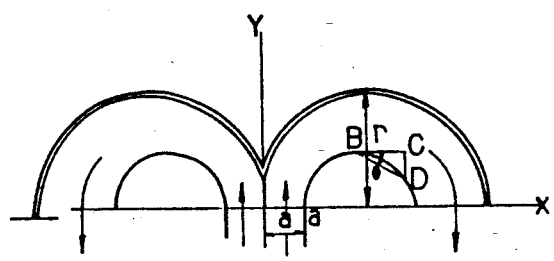
FIG. 4 is a view for illustrating the thrust of the present invention.
Figure 5:
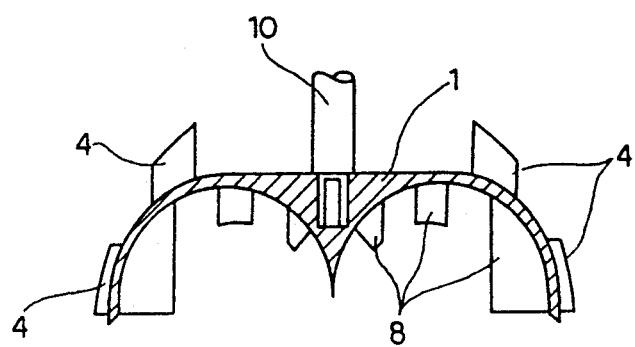
FIG. 5 is a cross-sectional side view of the rotating disc of the invention.
Figure 6:
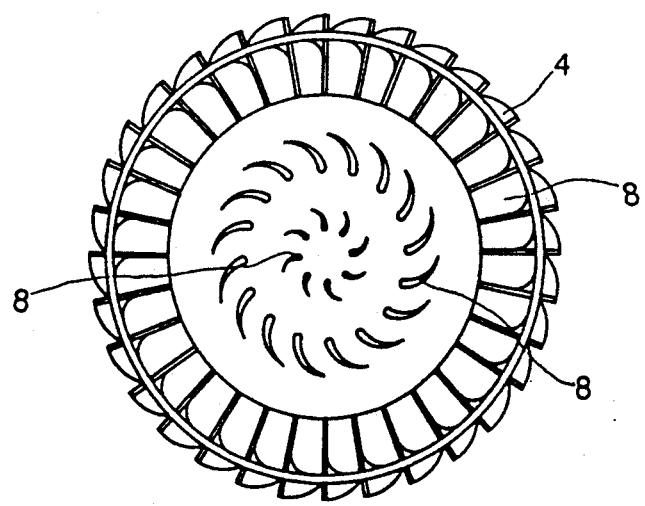
FIG. 6 is a rear view of the rotating disc in FIG. 5.
Figure 7:
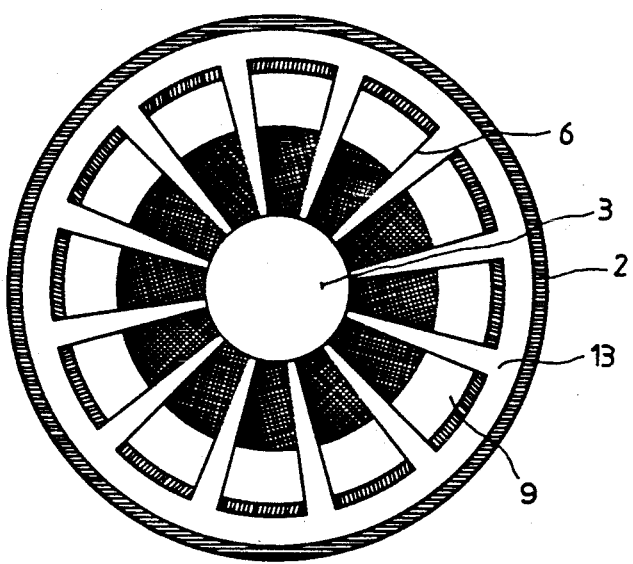
FIG. 7 is a bottom view of the turbine shown in FIG. 1.

The combustion chamber (3) whose outer shape is similar to the shape of the inner wall of the rotating disc (1) is located inside the rotating disc (1). And, it is also linked to the outer wall of the thrust turbine (2), and fixed in the middle of the inner space of the rotating disc (1) by the heat recovering panels (6). Thus, an exhaust nozzle exit (9) and the heat recovering panels (6) are arranged in a radial shape about the combustion chamber as shown in FIG. 7.

In order to extract the power, for compression of air, from the exhaust gases passing through the curved flow path formed between the inner wall of the rotating disc (1) and the outer wall of the combustion chamber (3) as shown in FIG. 1, rotor blades (8) and stator blades (7) of the turbine are attached to the inner wall of the rotating disc (1) and the outer wall of the combustion chamber (3), respectively, as shown in FIGS. 1, 2, 5 and 6.

Rotor blades (4) and stator blades (5) of the compressor are attached to the outer wall of the rotating disc (1) and the inner wall of the thrust turbine case (2), respectively, so as to compress the air from the inlet (12) and cool the rotating disc (1) in the curved flow path of incoming air which is formed between the outer wall of the rotating disc (1) and the inner wall of the thrust turbine case (2) as indicated in FIG. 1 and 2.

The operation of the present invention will be explained with an assumption that the thrust turbine engine is incorporated to a low-pressure compressor of a conventional basic turbojet engine on the same shaft.

When the rotating disc (1), including the rotor blades (4, 8) of a compressor and a turbine, rotates with constant speed, the compressed air, from the low-pressure compressor of a conventional basic turbojet engine, comes through the curved flow path of the thrust turbine.

The compressed air cools the surface of the rotating disc (1) and the compressor rotor blades (4) which are heated by combustion, and also recovers wasted heat on the hot surface of the disc (1) and rotor blades (4). Then, this heated air under pressure is repressurized by the rotor and stator blades (4, 5) of the compressor.

The repressurized air enters into the combustion chamber (3) through manifolds (13) which include heat recovering panels (6) and which intersect the exhaust nozzle (9). Part of the air entering into the combustion chamber (3) is used for burning the supplied fuel by the instantaneous combustion process in the combustion chamber (3). The remainder of the air, which retains high-pressure and high-velocity, is mixed with flame generated by combustion. By this process, complete combustion may be performed.

The gases being produced by aforementioned process are expanded, accelerated and expelled to the outside air through the exhaust nozzle exit (9) via the gas discharge passage (11) at the same time as the gases rotate along the curved flow path.

The shaft power being developed by high-speed revolution of the turbine rotor blades (8) about the shaft results from the force proportional to the pressure and the velocity of the exhaust gases. And also, the propulsive force (thrust) is generated from the powerful pressurized zone which is created at the inner wall of the rotating disc (1) by the centrifugal force acting to the inner wall of the rotating disc (1) and the pressure energy of exhaust gases.

Considering the characteristics of the heat-recovering-thrust-turbine, the specific volume (the ratio of the engine volume to its thrust) and the specific weight (the ratio of the engine weight to its thrust) of the thrust turbine can be be superior to those of the conventional gas turbine engines. Besides, the centrifugal force or the velocity energy is able to be used in the thrust turbine, while it is impossible to use the centrifugal force in the axial flow type divergent nozzle of the conventional gas turbine engine.

Further, the thermal efficiency of the thrust turbine may be improved since it has the capability of heat recovering. Advantages of the thrust turbine such as simple structure and reduced specific volume or reduced specific weight can contribute to mitigate the design restrictions of gas turbine engines in practical use. Moreover, there is further advantage that the compression and the turbine thrust can be concurrently produced inside and outside of the rotating disc.

What is claimed is:

1. A heat-recovering-thrust-turbine engine with the rotational path comprising:

a compression section for compressing air, including an air inlet and a compressed air exit;

a gas generation section comprising a combustion chamber wherein fuel supplied thereto is subjected to combustion;

a section for generating a turbine power and thrust;

an engine casing having an inner wall;

a bowl-shaped rotor within the engine casing having an outer wall and an inner wall defining an inner space;

the compression section being formed between the inner wall of the casing and the outer wall of the rotor;

compression stator blades attached to the inner wall of the casing;

compression rotor blades attached to the outer wall of the rotor;

the compression stator blades and compression rotor blades cooperating to compress air introduced into the compression section via said air inlet and to expel compressed air via said compressed air exit;

a plurality of manifolds providing inner communication between the compressed air exit of the compression section and the combustion chamber;

the turbine power and thrust generation section being located between the combustion chamber and the inner wall of the rotor and comprising:

turbine rotor blades on the inner wall of the rotor;

turbine stator blades mounted on the outer wall of the combustion chamber; and a nozzle for developing thrust from hot gases expelled from the engine via the nozzle;

the turbine power and thrust generating section defining a gas flow path by which hot gas is conveyed from the combustion chamber past the turbine rotor and stator blades and out of the engine via the exhaust nozzle; and the manifolds located so that the gas expelled form the nozzle passes over the manifolds and heats air passing through the manifolds into the combustion chamber.

2. An engine as in claim 1 wherein the air is rotated through an angle of 180° in the gas generation section as it moves from the combustion chamber to the exhaust nozzle.

3. An engine as in claim 1 wherein the air is rotated through an angle of 360° as it flows from said gas inlet to said exhaust nozzle.

4. An engine as in claim 1 wherein the rotor has the shape defined by a semi-circle rotated about an axis perpendicular to the center of the semi-circle.

5. An engine as in claim 4 wherein the air is rotated through an angle of 180° in the gas generation section as it moves from the combustion chamber to the exhaust nozzle.

6. An engine as in claim 4 wherein the air is rotated through an angle of 360° as it flows from said gas inlet to said exhaust nozzle.

* * * * *